United States Patent [19]

Sanders et al.

[11] Patent Number: 5,554,662
[45] Date of Patent: Sep. 10, 1996

[54] LOW VISCOSITY POLYMER POLYOLS A PROCESS FOR THEIR PRODUCTION AS WELL AS THE MANUFACTURE OF POLYURETHANE FROM MATERIALS

[75] Inventors: Josef Sanders, Leverkusen; Mark Kratz, Krefeld; Manfred Dietrich, Leverkusen; Torsten Heinemann, Köln; Helmut Woynar, Dormagen; Gundolf Jacobs, Rösrath; Uwe Scholz, Köln, all of Germany

[73] Assignee: Bayer Adtiengesellschaft, Leverkusen, Germany

[21] Appl. No.: 470,695

[22] Filed: Jun. 6, 1995

[30] Foreign Application Priority Data

Mar. 10, 1995 [DE] Germany .................. 195 08 578.7

[51] Int. Cl.⁶ .................. C08K 5/09; C08L 75/00
[52] U.S. Cl. .................. 521/137; 524/762; 524/773; 524/775; 524/776
[58] Field of Search .................. 521/137; 524/762, 524/773, 775, 776

[56] References Cited

U.S. PATENT DOCUMENTS

| | | | |
|---|---|---|---|
| Re. 33,291 | 8/1990 | Ramlow et al. | 521/137 |
| 3,304,273 | 2/1967 | Stamberger | 260/2.5 |
| 3,383,351 | 5/1968 | Stamberger | 260/33.2 |
| 3,652,639 | 3/1972 | Pizzini et al. | 260/465.4 |
| 3,823,201 | 7/1974 | Pizzini et al. | 260/861 |
| 4,230,823 | 10/1980 | Alberts et al. | 521/137 |
| 4,342,840 | 8/1982 | Kozawa et al. | 521/137 |
| 4,390,645 | 6/1983 | Hoffman et al. | 521/137 |
| 4,460,715 | 7/1984 | Hoffman et al. | 521/137 |
| 4,652,589 | 3/1987 | Simroth et al. | 521/137 |
| 5,093,412 | 3/1992 | Mente et al. | 524/762 |

FOREIGN PATENT DOCUMENTS

| | | |
|---|---|---|
| 1152536 | 8/1963 | Germany . |
| 1152537 | 8/1963 | Germany . |

*Primary Examiner*—Morton Foelak
*Attorney, Agent, or Firm*—Joseph C. Gil; N. Denise Brown

[57] ABSTRACT

A process for the production of stable, agglomerate-free, low viscosity graft copolymer dispersions through radical polymerization of ethylenically unsaturated monomers in the presence of a base polyol, a macromer, an enol ether of a specific formula, and optionally, an organic solvent. These enol ethers correspond to the general formula:

$$A=CH-O-R$$

wherein:

A represents a di-valent residue of the formula

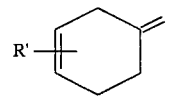

R represents an aliphatic hydrocarbon radical having 1 to 18 carbon atoms, a cycloaliphatic hydrocarbon radical having 5 to 10 carbon atoms, or a substituted or unsubstituted benzyl radical;

and

R' represents a hydrogen atom or an aliphatic hydrocarbon radical having 1 to 8 carbon atoms.

15 Claims, No Drawings

LOW VISCOSITY POLYMER POLYOLS A PROCESS FOR THEIR PRODUCTION AS WELL AS THE MANUFACTURE OF POLYURETHANE FROM MATERIALS

BACKGROUND OF THE INVENTION

Polymer polyols within the scope of the invention are products which can be obtained by the polymerization of ethylenically unsaturated compounds in the presence of polyether polyols (so-called "base polyols"), a macromer, and an enol ether of a specified formula. These can be used, for example, for the manufacture of polyurethane flexible foam materials. The principally used ethylenically unsaturated compounds are the monomers styrene and acrylonitrile, which are, for example, radically polymerized in polyether polyols as base polyols.

The production of such polymer polyols is, for example, described in the U.S. Pat. Nos. 3,383,351, 3,304,273, and Reissue 33,291, or in German Auslegeschrifien 1,152,536 and 1,152,537.

The polymer polyols in the ideal case are relatively low viscosity, finely dispersed, non-sedimenting dispersions of the polymerizate (preferably of an acrylonitrile/styrene-graft-copolymer)in the essentially unchanged polyether polyol. Characteristic identifiers for quality and applicability of the polymer polyols are viscosity, storage stability (sedimentation resistance) and small particle size. These characteristics are primarily influenced by the type and quantity ratio of the base materials. The solids content (monomer portion in the preparation) and the monomer ratio (for example, the styrene/acrylonitrile ratio) have an especially large influence on the quality of the final product.

The most important goals during the production of polymer polyols are achieving a high solids content (at least 40%) at the highest possible styrene percentage, and the lowest possible viscosity, with excellent product stability at the same time.

In order to achieve product stability, i.e the elimination of the formation of undesired, agglomerated polymer particles which precipitate from the continuous phase of the base polyol, these polymer particles must be stabilized during the polymer polyol production. This stabilization is effected on one hand through the building-in of a part of the molecules of the base polyether into the in-situ formed polymer. The effectiveness of stabilization is thereby favored on the other hand through a high molecular weight of the base polyethers, and through a high acrylonitrile portion in the monomer mixture. A nigh acrylonitrile content increases the color of the polymeric polyols, and correspondingly, the discoloration tendency of the flexible foam manufactured from them, and accordingly is undesirable. Another problem is that the viscosity of the polymer polyols is increased through the use of base polyols with higher molecular weights.

One possibility to obtain low viscosity polymer polyols with higher solids contents essentially independent from the molecular weight of the base polyol and from the acrylonitrile portion in the monomer mixture, is through the use of chain transfer agents. Some of the chain transfer agents commonly used in this polymerization technology include compounds such as, for example the usual mercaptans, halogenated alkanes, or alcohols.

Also known, is the use of enol ethers as chain transfer agents as described in EP-A 008,444, through which the production of polymer polyols having a relatively low viscosity at a relatively high solids content and styrene portion are made possible.

Another possibility for the stabilization of polymer polyols is the use of compounds that are compatible with the polyol phase, which contain ethylenically unsaturated, polymerizable groups. These so-called macromers copolymerize with the vinyl monomers such that the developing polymer particles become sterically stabilized by the polyether side chains, and are in this way protected against agglomeration and sedimentation.

The production of polymer polyols using macromers is disclosed in, for example, U.S. Pat. Nos. 3,652,639, 3,823, 201, 4,460,715, 4,390,645, 5,093,412, and 4,342,840. The ethylenically unsaturated double bonds are introduced into the polyether polyols through reaction with cyclic, unsaturated carbonic acid anhydrides, such as maleic acid anhydride, and subsequent reaction with ethylene or propylene oxide; through esterification with acrylic or methacrylic acid (or derivatives thereof); through reaction with allylglycidyl ether; through reaction with an unsaturated isocyanate such as, for example, isocyanatoalkyl acrylate and isocyanatomethacrylate, 1-(1-isocyanato-1-methylethyl)-3-(1-methylethenyl)-benzene or NCO-functional adducts from a polyisocyanate and hydroxyethyl acrylate or hydroxypropyl acrylate.

Also, the combination of macromers with chain transfer agents such as mercaptans or alcohols, is described in German Auslegeschriff 2,500,274 E:P-A 0,190,769, as well as in EP-A 0,091,036.

Although the mentioned processes lead to polymer polyols which can basically be used as the polyol component for the manufacture of polyurethane flexible foams, further improvements are desirable. Also, the viscosities of higher solids content polymer polyols, especially those containing a higher styrene portion in the monomer mixture are still very high as can be seen from the literature, and often smaller agglomerized polymer particles can be observed in the residue, i.e. a finely dispersed product is not yet achieved.

Surprisingly, it was found that agglomerate-free polymer polyols with high solids content and low viscosities can be prepared when the polymer polyol is produced in the presence of a macromer of the type described above, and an enol ether of a specific formula as chain transfer agents.

Through the use of a combination of macromers with the special chain transfer agents of the enol ether type as demonstrated by the working examples herein, stable, finely dispersed polymer polyols are produced which have lower viscosities at a specific solids content and styrene portion, or contain a higher styrene content and/or solids content at a specific viscosity than previous products produced using other known combinations of chain transfer agents and macromers.

DESCRIPTION OF THE INVENTION

The subject of the invention is a process for the production of stable, agglomerate-free, low viscosity graft copolymer dispersions comprising the radical polymerization of at least one ethylenically unsaturated monomer in the presence of a base polyol, a macromer, and an enol ether of the general formula:

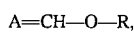

wherein:

R represents an aliphatic hydrocarbon radical having 1 to 18 carbon atoms, a cycloaliphatic hydrocarbon radical having 5 to 10 carbon atoms (or a substituted or unsubstituted benzyl radical);

A represents a divalent radical of the formula:

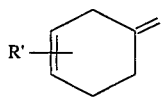

wherein

R' represents hydrogen or an aliphatic hydrocarbon radical having 1 to 8 carbon atoms.

This process is optionally carried out in the presence of an organic solvent.

According to the invention it is preferred that:

a) the ethylenically unsaturated monomer is present in a quantity of between 25 to 65% by weight, based on the total quantity of monomers and polyol (polyol is the mixture of base polyol and macromer.

b) the ethylenically unsaturated monomers comprise a mixture of styrene and acrylonitrile.

c) the mixtures of styrene and acrylonitrile suitable as the ethylenically unsaturated monomers are present in a weight ratio of between 20:80 and 100:0, and most preferably of between 50:50 and 80:20.

d) polyalkylene oxides containing at least two to six hydroxyl groups and having an OH-number between 20 and 100, and preferably between 30 and 70, are preferred as the base polyol.

e) the macromers preferably have a molecular weight between 3,000 and 15,000, preferably between 4,500 and 12,000 (g/mol), and a functionality between 2 and 6.

f) the macromers preferably have a statistical average of 0.1 to 1.5, preferably 0.3 to 1, mole of double bonds per mole polyol.

g) the macromers are preferably present in a quantity between 2 to 20%, most preferably 3 to 10% by weight, based on the total weight of polyol (polyol is the mixture of base polyol and macromer).

h) (cyclohex-3-enyliden methoxymethyl)-benzene is the preferred enol ether.

i) the enol ether is present in a quantity between 0.1 to 5% weight, based on the total weight of the monomer mixture.

and j) preferred organic solvents are toluene and ethylbenzene.

The present invention also relates to the stable, agglomerate-free, low viscosity graft copolymer dispersions, obtainable based on the above process, and the manufacture of polyurethane foam materials based on the isocyanate-polyaddition process wherein the polyol component comprises the graft copolymer dispersion obtainable from the above process.

Suitable polyols for the so-called "base polyols" include, for example, those polyols having at least two hydroxyl groups, and preferably polyether polyols including, for example, the known addition products of cyclic ethers such as ethylene oxide, propylene oxide, styrene oxide, butylene oxide on starter compounds such as, for example, polyhydroxy compounds such as alkylene glycols, glycerin, trimethylol propane, pentaerythritol, sorbitol, amines such as, for example, ethylene diamine and toluene diamine. The polyether polyols which are suitable as "base polyols" preferably have functionalities between 2 and 6, and an OH number between 20 and 100. The polyether chains are preferably built up from propylene oxide and ethylene oxide units. Also, polyester polyols having functionalities of preferably from 2 to 6 and an OH number between 20 and 100 are considered suitable as "base polyols".

The polymer polyols are obtained through radical polymerization of at least one monomer containing ethylenically unsaturated end-groups or a mixture of monomers containing ethylenically unsaturated end-groups in the base polyols, which are preferably the polyether polyols as specified hereinabove. Some examples of suitable monomers containing ethylenically unsaturated end-groups include monomers such as butadiene, styrene, α-methylstyrene, methylstyrene, ethylstyrene, acrylonitrile, methacrylonitrile, methylmethacrylate, and acrylic acid ester. Styrene and acrylonitrile are the preferred monomers. The quantity of ethylenically unsaturated monomers to be used in the process according to the present invention is between 25 and 65% by weight, based on the total weight of monomers and polyol. The weight ratio of styrene to acrylonitrile monomers is preferably from 20:80 to 100:0, most preferably from 50:50 to 80:20.

The initiation of the radical polymerization is performed in the usual manner, with the usual radical-forming initiators. Initiators of this type include, for example, organic peroxides such as benzoyl peroxide, tertbutyloctoate, dodecanoyl peroxide; and azo compounds such as azoisobutyronitrile or 2,2'-azobis(2-methylbutyronitrile).

The polyols suited for the preparation of macromers used for the process of the present invention include, for example, the known polyols, preferably polyether polyols, such as the known addition products of cyclic ethers such as ethylene oxide, propylene oxide, styrene oxide. butylene oxide, etc. with starter compounds such as, for example, polyhydroxy compounds including alkylene glycols, glycerin, trimethylol propane, penterythritol, sorbitol, and amines such as, for example, ethylene diamine and tolylene diamine. The polyether polyols used in the preparation of the macromers have functionalities between 2 and 6, and a molecular weight between 3,000 and 15,000 g/mol, preferably 4,500 to 12,000. The polyether chains are preferably built from propylene oxide and ethylene oxide units.

The ethylenically unsaturated groups can be introduced into the polyol material to form the macromer as described in the processes known in the literature. The macromer formation is preferably via the reaction of the base polyol with maleic acid anhydride, and the subsequent alkoxylation with ethylene or propylene oxide; the reaction of the base polyol with acrylic acid or the methyl or ethyl ester of acrylic acid; and the reaction with an unsaturated isocyanate such as, for example, 1-(1-isocyanato-1-methylethyl)-3-(1-methylethenyl)-benzene or an NCO-functional adduct produced from a polyisocyanate and a hydroxyethyl acrylate or hydroxypropyl acrylate. For the production of the latter type of macromer, suitable polyisocyanates include, for example, hexamethylene diisocyanate, isophorone diisocyanate, diphenylmethane diisocyanate and most preferably toluene diisocyanate.

The produced macromers contain on as a statistical average normally from 0.1 to 1.5, and preferably 0.3 to 1 moles of double bonds per mole of polyol.

The enol ether to be used in accordance with the invention is known in the literature. The production of suitable enol ethers is described in, for example, the U.S. Pat. No. 3,639,485, the disclosure of which is herein incorporated by reference, and in German patents 1,668,091 and 1,768,396. Suitable representatives of compounds of this class are specified in, for example, U.S. Pat. No. 4,230,823, the disclosure of which is herein incorporated by reference. A particularly preferred enol ether is (cyclohex-3-enyliden methoxymethyl)-benzene, which is commercially available from Bayer AG under the name Vulkazon AFD.

The enol ether is normally present in a quantity between 0.1 and 5% by weight, based on the total weight of the monomer or mixture of monomers used.

It is also within the scope of the present invention that organic solvents are present in the process according to the invention. Suitable organic solvents include hydrocarbons such as, for example, toluene, ethylbenzene, isopropylbenzene, xylols, ketones, such as acetone or methylethyl ketone, and alcohols such as methanol, ethanol, isopropanol or butanol. Preferred solvents are toluene and ethylbenzene.

The process can be operated either on a discontinuous basis or on a continuous basis. It is within the scope of the invention, for example, to meter-in a mixture which contains the ethylenically unsaturated monomers, the enol ether, the initiator, and a portion of the polyol and optionally any solvent into a mixer, which contains the preheated polyether and the macromer. It is also within the scope of the invention to meter in a portion of the macromer, together with the ethylenically unsaturated monomers, the enol ether, a portion of the polyether, and, optionally, the solvent. Another possibility is to add the enol ether to the polyether or to a major portion of the polyether and the macromer in the reactor, and to meter in the remaining components.

In addition, a mixture of all the reaction components can be continuously metered into a reactor, and the product can likewise be taken from an overflow.

The temperature at which the polymerization is carried out is normally 80° to 140° C., preferably 90° to 130° C.

Following the completion of the polymerization reaction, the product is usually purified by separating readily volatile parts such as residual monomers, solvents, etc. by vacuum distillation.

The polymer polyols produced in accordance with the inventive process are particularly suitable for polyurethane plastic materials based on the isocyanate polyaddition process. These polymer polyols are free of agglomerates, are stable, and have low viscosities.

The manufacture of polyurethane plastic materials, preferably, flexible polyurethane foams comprise the reaction of a) organic polyisocyanates with b) the polymeric polyols produced according to the invention, and in the presence of c) optionally, other high molecular weight and/or low molecular weight compounds containing hydrogen atoms reactive with isocyanate groups, d) catalysts, e) water and/or low-boiling hydrocarbons as blowing agents and f) aids and/or additives In the manufacture of polyurethane plastic materials, the following components are suitable for use as base components.

Suitable polyisocyanates include, for example, the aliphatic, cycloaliphatic, araliphatic, aromatic and heterocyclic polyisocyanates such as those described by, for example, W. Siefken in Justus Liebigs Annalen der Chemie, 362, pages 75 to 136. These polyisocyanates include those compounds of the general formula:

wherein n represents a number of from 2 to 5, preferably 2 to 3; and

Q represents an aliphatic hydrocarbon radical having 2 to 18, preferably 6 to 10 carbon atoms; a cycloaliphatic hydrocarbon radical having 4 to 15, preferably 5 to 10 carbon atoms; an aromatic hydrocarbon radical having 6 to 15, preferably 6 to 13 carbon atoms.

Such polyisocyanate are specified in, for example, German 2,832,253, pages 10 to 11.

Normally, the technically easily accessible polyisocyanates are particularly preferred including compounds such as, for example, the 2,4- and 2,6-toluene diisocyanate, as well as any mixtures of these isomers ("TDI"), diphenylmethane diisocyanate ("MDI") and polyphenylpolymethylene polyisocyanate, such as those produced based on the aniline-formaldehyde-condensation and following phosgenation. It is also possible to use polyisocyanates commonly referred to as the "modified polyisocyanates". These may contain carbodiimide groups, urethane groups, allophanate groups, isocyanurate groups, carbamide groups and/or biuret groups. These also include those modified polyisocyanates that are derived from 2,4- and/or 2,6-toluene diisocyanate or 4,4'- and/or 2,4'-diphenylmethane diisocyanate.

The polymer polyols produced by the process of the present invention are suitable active hydrogen atom containing materials to be used in the production of polyurethane plastic materials.

In addition to the polymer polyols, it is also possible to optionally include organic compounds having at least 2 hydrogen atoms reactive with isocyanates as base components with molecular weights between 40 and 10,000 g/mol, preferably polyether polyols. These include the known addition products of cyclic ethers such as ethylene oxide, propylene oxide, styrene oxide, butylene oxide, etc. with suitable starter compounds such as, for example, polyhydroxy compounds such as alkylene glycols, glycerin, trimethylol propane, pentaerythritol, sorbitol, amines such as ethylene diamine or tolylene diamine, as well as the starter compounds themselves.

Suitable catalysts for the manufacture of polyurethane plastic materials include, for example, the known catalysts commonly used in polyurethane chemistry may be used.

It is also possible to include water and/or low-boiling hydrocarbons as blowing agents including, for example, low-boiling alkanes such as pentane, cycloalkanes, such as cyclopentane, furthermore, alkenes as well as gases like carbon dioxide that are brought into the reaction mixture under pressure. Other known additives and auxiliary agents may also be included in this reaction mixture to produce polyurethane plastic materials. These additives and auxiliary agents include, for example, surface active additives such as emulsifiers and foam stabilizers, reaction inhibitors, cell regulators of known type such as paraffin, fatty alcohols, or dimethyl polysiloxane, as well as pigments or dyestuffs, and flame retardants of known type, stabilizers against aging and environmental factors, softeners and fungistatically and bacteriostatically acting substances.

Suitable examples of optional additives and auxiliary agents such as surface active additives and foam stabilizers, reaction inhibitors, stabilizers, flame retardant substances, softeners, dyestuffs, as well as fungistatically and bacteriostatically effective substances and details about the method of application and effectiveness of these additives are discussed in detail in the Kunststoff-Handbuch, Volume VII, by G. Oertel, Carl Hanser Publishers, Munich, 1993, for example, on pages 104 to 127.

The manufacture of flexible polyurethane foam materials is done through known methods such as described in the Kunststoff Handbuch, Volume VII, by G. Oertel, Carl Hanser Publisher, Munich, 1993, on pages 139 to 263.

The invention is further illustrated but is not intended to be limited by the following examples in which all parts and percentages are by weight unless otherwise specified.

EXAMPLES

The following compounds are used in the process of the present invention.

Polyol A:
A glycerin/propylene glycol started (weight ratio 90:10) polyether, produced by the addition of PO (30%), PO/EO (40/10%) and PO (20%), and having an OH number of 56 mg KOH/g.

Polyol B:
A trimethylol propane started polyether produced by addition of PO (82.3%) and EO (17.7%), having a molecular weight of 6,000.

Polyol C:
A trimethylol propane started polyether produced by addition of PO (82.5%) and EO (17.5%), having a molecular weight of 4,800.

Polymer polyol A:
VP.PU 80WB40, commercially available from Bayer AG., solids content approx. 40%, styrene portion approx. 60%.

Macromer A:
The reaction product from one mole polyol C with 0.75 mole maleic acid anhydride, and followed by the addition of 0.9 mole ethylene oxide. The product has a double bond content of 49 meq/kg.

Macromer B:
The reaction product from one mole polyol C with 1.2 mole acrylic acid, produced through azeotropic esterification in the presence of 0.1% by weight p-toluene sulfonic acid (based on the weight of polyol C) and toluene as a solvent. The product has a double bond content of 100 meq/kg.

Macromer C:
The reaction product of one mole polyol B with 1.2 mole acrylic acid, produced through azeotropic esterification in the presence of 0.1% by weight p-toluene sulfonic acid (based on the weight of polyol B) and toluene as a solvent. The product has a double bond content of 139 meq/kg.

Macromer D:
The reaction product from one mole polyol C with the reaction product of 0.75 mole hydroxypropylacrylate and 0.825 mol toluene diisocyanate. The product has a double bond content of 56 meq/kg.

Macromer E:
The reaction product from one mole polyol B with the reaction product of 0.75 mole hydroxypropylacrylate and 0.9 mole toluene diisocyanate. The product has a double bond content of 71 meq/kg.

Macromer F:
The reaction product from one mole polyol C with one mole 1-(1-isocyanato-1-methylethyl)-3-(1-methylethenyl)-benzene. The product has a double bond content of 228 meq/kg.

Macromer G:
The reaction product from one mole polyol B with
one mole 1-(1-isocyanato-1-methylethyl)-3-(1-methylethenyl)-benzene. The product has a double bond content of 211 meq/kg.

Enol ether A:
(Cyclohex-3-enylidenemethoxymethyl)-benzene (cis, trans-isomer mixture), commercially available under the name Vulkazon AFD from Bayer AG.

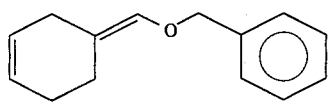

Enol ether B:
(Cyclohex-3-enylidene)-cyclohexylether (cis, trans-isomer mixture), produced by the reaction of cyclohex-3-en-carbaldehyde with cyclohexanol in the presence of p-toluene sulfonic acid and quinoline (similar to the method described in EP 008,444, believed to correspond to U.S. Pat. No. 4,230,823). b.p.: 82° C. at 0.15 mbar

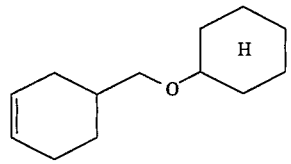

Enol ether C:
(Norbornen-3-enylidenemethoxymethyl)-benzene (cis, trans-isomer mixture) produced by the reaction of 5-norbornen-2-aldehyde with benzyl alcohol in the presence of p-toluene sulfonic acid and quinoline (similar to the method described in EP 008,444, believed to correspond to U.S. Pat. No. 4,230,823). b.p.:106° C. at 0.1 mbar. (not according to the invention).

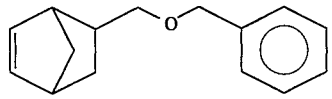

Enol ether D:
Butylidene-benzylether (cis,trans-isomer mixture) produced by the reaction of 2-butyraldehyde with benzyl alcohol in the presence of p-toluene sulfonic acid and quinoline (similar to the method described in EP 008,444, believed to correspond to U.S. Pat. No. 4,230,823). b.p.: 73° C. at 0.2 mbar. (not according to the invention).

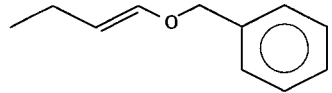

Enol ether E:
(Cyclohex-3-enylidene)-butylether (cis,trans-isomer mixture), produced through transformation of cyclohex-3-en-carbaldehyde with n-butanol in the presence of p-toluene sulfonic acid and quinoline (similar to the method described in EP 008,444, believed to correspond to U.S. Pat. No. 4,230,823)., b.p.: 68° C. at 0.1 mbar.

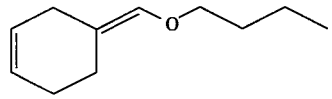

Guidelines for the Production of Polymer Polyols:
A mixture consisting of 375.3 g polyol, 250.2 g styrene, 166.8 g acrylonitrile 8.34 g enol ether (or other chain transfer agents), 5.21 g 2,2'-azobis(2-methylbutyronitrile) and 144 g toluene is uniformly metered over a period of two hours into a mixture of 225.2 g polyol and 25 g macromer under agitation at 125° C. This is followed by post agitation for 30 minutes at 125° C. Then, a solution of 0.92 g 2,2'-azobis(2-methylbutyronitrile) in 25.4 g toluene is quickly added, and agitation is continued for another hour at 125° C. Subsequently, the toluene and other volatile components are distilled off at 125° C. first with the aid of a water aspirator (15 mbar) for more than an hour, and then under reduced pressure for two hours (<2 mbar). The product is discharged through a sieve having a mesh size of 100 µm after cooling to approx. 100° C. Performance of the Residue Test:

Approx. 3 ml polymer polyol is placed in a 10 ml beaded rim glass whose inside walls are completely wetted with the polymer polyol. After standing for 24 hours at room temperature, the residue on the glass walls is evaluated by counting the number of particles of approx. 5 to 30 µm diameter.

good: up to approx. 10 particles per cm²
medium: from approx. 10 to 30 particles per cm²
poor: from approx. 30 particles per cm²

EXAMPLES 1

Polymer polyols were produced from a system wherein polyol A was used as the base polyol, macromer A was used as the macromer, and different chain transfer agents were used according to the general production instructions above. The reaction was also carried out without chain transfer agents for comparison purposes.

The results are summarized in the following table:

TABLE 1

| Example | Chain transfer agent | Viscosity (mPa · s/ 25° C.) | | Residue |
| --- | --- | --- | --- | --- |
| 1 | — | 3990 | | good |
| 2 | isopropanol | 3670 | [1] | poor |
| 3 | 2-butanol | 3710 | | good |
| 4 | methylethylketone | 3720 | | good |
| 5 | tetrachloromethane | 3740 | | good |
| 6 | 1-dodecylmercaptan | 4990 | | medium |
| 7 | enol ether A | 3240 | | good |
| 8 | enol ether B | 3190 | | good |

[1] unfiltrable product

The polymer polyols produced from enol ethers A and B in accordance with the present invention gave the lowest viscosity in this series of experiments.

EXAMPLES 9–19

Polymer polymers were produced from a system wherein polyol A was used as the base polyol, macromer B was used as the macromer, and different chain transfer agents were used according to the general production instructions above. The reaction was also carried out without chain transfer agents for comparison purposes. The results are summarized in the following table:

TABLE 2

| Example | Chain transfer agent | Viscosities (mPa · s/ 25° C.) | | Residue |
| --- | --- | --- | --- | --- |
| 9 | — | — | [2] | — |
| 10 | isopropanol | 7450 | [1] | poor |
| 11 | 2-butanol | 7970 | [1] | poor |
| 12 | methylethylketone | — | [3] | — |
| 13 | tetrachloromethane | 4000 | | good |
| 14 | 1-dodecylmercaptan | 29850 | | poor |

TABLE 2-continued

| Example | Chain transfer agent | Viscosities (mPa · s/ 25° C.) | | Residue |
| --- | --- | --- | --- | --- |
| 15 | enol ether A | 3550 | | good |
| 16 | enol ether B | 3450 | | good |
| 17 | enol ether C | — | [3] | — |
| 18 | enol ether D | 4480 | | medium |
| 19 | enol ether E | 3480 | | good |

[1] unfiltrable product
[2] The reaction had to be interrupted because the preparation was no longer stirrable due to high viscosity.
[3] The reaction had to be interrupted because the product was lumpy and unstable.

The enol ethers A, B and E based on the invention gave finely dispersed, low viscosity products in this series, while the enol ethers C and D and the other chain transfer agents not based on the invention resulted in dispersions which were either unstable or coarse, and exhibited higher viscosities.

EXAMPLES 20–27

Polymer polyols were produced from a system wherein polyol A was used as a base polyol, macromer C was used as the macromer, and different chain transfer agents were used according to the general production instructions. The reaction was also carried out without chain transfer agents for comparison purposes. The results are summarized in the following table:

TABLE 3

| Example | Chain Transfer Agent | Viscosity (mPa · s/25° C.) | | Residue |
| --- | --- | --- | --- | --- |
| 20 | — | 4950 | [1] | poor |
| 21 | isopropanol | 4330 | [1] | poor |
| 22 | 2-butanol | 4710 | [1] | poor |
| 23 | methylethylketone | 4630 | | poor |
| 24 | tetrachloromethane | 4100 | | medium |
| 25 | 1-dodecylmercaptan | — | [2] | — |
| 26 | enol ether A | 3550 | | good |
| 27 | enol ether B | 3300 | | good |

[1] unfiltrable product
[2] The reaction had to be interrupted because the preparation could no longer be stirred due to high viscosity.

Enol ethers A and B when used in combination with macromer C in accordance with the present invention, also resulted in finely dispersed, low viscosity products. By comparison, the other chain transfer agents resulted in dispersions which were either unstable or coarse, and exhibited higher viscosities.

EXAMPLE 28–35

Polymer polyols were produced from a system wherein polyol A was used as the base polyol, macromer D as the macromer, and different chain transfer agents were used according to the general production instructions above. The reaction was also carried out without chain transfer agents for comparison purposes.

The results are summarized in the following table:

TABLE 4

| Example | Chain transfer agent | Viscosity (mPa · s/25° C.) | | Residuee |
|---|---|---|---|---|
| 28 | — | 19000 | [1] | poor |
| 29 | isopropanol | — | [3] | — |
| 30 | 2-butanol | — | [2] | — |
| 31 | methylethylketone | — | [2] | — |
| 32 | tetrachloromethane | 5840 | | medium |
| 33 | 1-dodecylmercaptan | 13200 | | poor |
| 34 | enol ether A | 3140 | | good |
| 35 | enol ether B | 3340 | | good |

[1] unfiltrable product
[2] The reaction had to be interrupted because the preparation was no longer stirrable due to high viscosity
[3] The reaction had to be interrupted because the product was lumpy and unstable.

When enol ethers A and B are used in combination with the macromer D, the advantage of the present invention becomes clearer. Stable, low viscosity products are only obtained when the specific enol ethers of the present invention are used.

EXAMPLES 36–43

Polymer polyols were produced from a system wherein polyol A was used as the base polyol, macromer E as the macromer, and different chain transfer agents were used according to the general production instructions above. The reaction was also carried out without chain transfer agents for comparison purposes.

The results are summarized in the following table:

TABLE 5

| Example | Chain transfer agent | Viscosity (mPa · s/25° C.) | | Residue |
|---|---|---|---|---|
| 36 | — | 7110 | [1] | poor |
| 37 | isopropanol | 4800 | [1] | poor |
| 38 | 2-butanol | 5180 | | poor |
| 39 | methylethylketone | 5100 | | poor |
| 40 | tetrachloromethane | 4850 | | medium |
| 41 | 1-dodecylmercaptan | 5250 | | medium |
| 42 | enol ether A | 3550 | | good |
| 43 | enol ether B | 3260 | | good |

[1] unfiltrable product

Only the enol ethers A and B in accordance with the present invention resulted in finely dispersed, low viscosity products.

EXAMPLES 44–51

Polymer polyols were produced from a system wherein polyol A was used as the base polyol, macromer F as the macromer, and different chain transfer agents were used according to the general production instructions above. The reaction was also carried out without chain transfer agents for comparison purposes.

The results are summarized in the following table:

TABLE 6

| Example | Chain transfer agent | Viscosity (mPa · s/25° C.) | | Residue |
|---|---|---|---|---|
| 44 | — | — | [2] | — |
| 45 | isopropanol | — | [2] | — |
| 46 | 2-butanol | — | [2] | — |

TABLE 6-continued

| Example | Chain transfer agent | Viscosity (mPa · s/25° C.) | | Residue |
|---|---|---|---|---|
| 47 | methylethylketone | — | [2] | — |
| 48 | tetrachloromethane | 6410 | | poor |
| 49 | 1-dodecylmercaptan | 5870 | | poor |
| 50 | enol ether A | 4410 | | good |
| 51 | enol ether B | 4020 | | good |

[2] Reaction had to be interrupted because the preparation could no longer stirred due to high viscosity.

The advantage of the enol ethers A and B according to the invention becomes particularly clear when these are used in combination with macromer F. Only the enol ethers required by the present invention resulted in fine, low viscosity dispersions. Dispersions which were either unstable or coarse, and exhibited higher viscosities were obtained with the other chain transfer agents.

EXAMPLE 52–59

Polymer polyols were produced from a system wherein polyol A was used as the base polyol, macromer G was used as the macromer, and different chain transfer agents were used according to the general production instructions above. The reaction was also carried out without chain transfer agents for comparison purposes.

The results are summarized in the following table:

TABLE 7

| Example | Chain transfer agent | Viscosity (mPa · s/25° C.) | | Residue |
|---|---|---|---|---|
| 52 | — | 9500 | | poor |
| 53 | isopropanol | 6800 | [1] | poor |
| 54 | 2-butanol | 6330 | | poor |
| 55 | methylethylketone | 5950 | | poor |
| 56 | tetrachloromethane | 4940 | | medium |
| 57 | 1-dodecylmercaptan | 3800 | | medium |
| 59 | enol ether A | 3480 | | good |
| 60 | enol ether B | 3780 | | good |

[1] unfiltrable product

Only enol ethers A and B which are according to the invention resulted in finely dispersed, low viscosity products.

EXAMPLES 60–91

These examples demonstrate the manufacture of flexible foam materials from the polymer polyols produced according to the invention as set forth hereinabove in Examples 8, 15, 27, 35, 42, 50 and 59. The following procedure was used.

A mixture comprising all of the components (except the catalyst and polyisocyanate) was intensely mixed. The catalyst 3 was added, and the mixture was briefly mixed. Then, the polyisocyanate was added while stirring. Subsequently, the reaction mixture was poured into an open mold, wherein it foams up to form a flexible foam.

In addition to the components described above, the following components were used to manufacture the flexible foams.

Catalyst 1

Desmorapid DEMEA, commercially available from Rhein Chemie, Rheinau

Catalyst 2

RC-PUR activator 108, commercially available from Rhein Chemie, Rheinau
Catalyst 3
Desmorapid SO, commercially available from Rhein Chemie, Rheinau
Stabilizer:
Stabilizer OS 22, commercially available from Bayer AG
Isocyanate:
Toluylene diisocyanate (Desmodur T 80, commercially available from Bayer AG)
The results of the foaming tests are summarized in the table below: (quantity in weight portions each).

The properties of the foams were determined using the following test methods:

| Raw Density | DIN 53420 |
| Tensile Strength | DIN 53571 |
| Breaking Elongation | DIN 53571 |
| Compression Force | DIN 53577 |

TABLE 8

Results of the foam recipes with 10% solids (Information in parts by weight; Isocyanate Index 108; raw density approx. 23 to 24 kg/m³)

| | Example 60 | Example 61 | Example 62 | Example 63 | Example 64 | Example 65 | Example 66 | Example 67 |
|---|---|---|---|---|---|---|---|---|
| Polyol A | 75 | 75 | 75 | 75 | 75 | 75 | 75 | 75 |
| Polymer Polyol A | 25 | | | | | | | |
| Example 8 | | 25 | | | | | | |
| Example 15 | | | 25 | | | | | |
| Example 27 | | | | 25 | | | | |
| Example 35 | | | | | 25 | | | |
| Example 42 | | | | | | 25 | | |
| Example 50 | | | | | | | 25 | |
| Example 59 | | | | | | | | 25 |
| Water | 4.5 | 4.5 | 4.5 | 4.5 | 4.5 | 4.5 | 4.5 | 4.5 |
| Stabilizer | 1 | 1 | 1 | 1 | 1 | 1 | 1 | 1 |
| Catalyst 1 | 0.1 | 0.1 | 0.1 | 0.1 | 0.1 | 0.1 | 0.1 | 0.1 |
| Catalyst 2 | 0.05 | 0.05 | 0.05 | 0.05 | 0.05 | 0.05 | 0.05 | 0.05 |
| Catalyst 3 | 0.13 | 0.15 | 0.15 | 0.15 | 0.15 | 0.15 | 0.15 | 0.15 |
| Foamability | very good | very good | very good | very good | very good | very good | very good | very good |
| Open cells | very good | very good | very good | very good | very good | very good | very good | very good |
| Raw density (kg/m³) | 23 | 24 | 24 | 23 | 24 | 24 | 24 | 24 |
| Tensile strength (kPa) | 121 | 126 | 126 | 145 | 137 | 123 | 146 | 128 |
| Elongation at Break (%) | 131 | 103 | 117 | 128 | 123 | 97 | 125 | 101 |
| Hardness 40% (kPa) | 4.4 | 5.5 | 4.90 | 5.1 | 5.3 | 5.6 | 5.4 | 5.7 |
| Grip/Elasticity | very good | very good | very good | very good | very good | very good | very good | good |

TABLE 9

Results of the foam recipes with 20% solids (Information in weight parts; Isocyanate Index 108; raw density approx. 23 to 24 kg/m³)

| | Example 68 | Example 69 | Example 70 | Example 71 | Example 72 | Example 73 | Example 74 | Example 75 |
|---|---|---|---|---|---|---|---|---|
| Polyol A | 50 | 50 | 50 | 50 | 50 | 50 | 50 | 50 |
| Polymer polyol A | 50 | | | | | | | |
| Example 8 | | 50 | | | | | | |
| Example 15 | | | 50 | | | | | |
| Example 27 | | | | 50 | | | | |
| Example 35 | | | | | 50 | | | |
| Example 42 | | | | | | 50 | | |
| Example 50 | | | | | | | 50 | |
| Example 59 | | | | | | | | 50 |
| Water | 4.5 | 4.5 | 4.5 | 4.5 | 4.5 | 4.5 | 4.5 | 4.5 |
| Stabilizer | 1 | 1 | 1 | 1 | 1 | 1 | 1 | 1 |
| Catalyst 1 | 0.1 | 0.1 | 0.1 | 0.1 | 0.1 | 0.1 | 0.1 | 0.1 |
| Catalyst 2 | 0.05 | 0.05 | 0.05 | 0.05 | 0.05 | 0.05 | 0.05 | 0.05 |
| Catalyst 3 | 0.13 | 0.13 | 0.13 | 0.13 | 0.13 | 0.13 | 0.13 | 0.13 |
| Foamability | very good | very good | very good | very good | very good | very good | very good | very good |
| Open cells | very good | very good | very good | very good | very good | very good | very good | very good |
| Raw density (kg/m³) | 23 | 23 | 23 | 23 | 23 | 24 | 23 | 23 |
| Tensile strength | 147 | 121 | 148 | 144 | 148 | 144 | 137 | 141 |

TABLE 9-continued

Results of the foam recipes with 20% solids (Information in weight parts; Isocyanate Index 108; raw density approx. 23 to 24 kg/m³)

|  | Example 68 | Example 69 | Example 70 | Example 71 | Example 72 | Example 73 | Example 74 | Example 75 |
|---|---|---|---|---|---|---|---|---|
| (kPa) | | | | | | | | |
| Elongation at Break (%) | 126 | 95 | 97 | 86 | 100 | 102 | 103 | 108 |
| Hardness 40% (kPa) | 5.7 | 6.1 | 6.1 | 6.8 | 6 | 6.1 | 5.9 | 5.6 |
| Grip/elasticity | very good | very good | very good | very good | very good | very good | very good | very good |

TABLE 10

Results of the foam recipes with 10% solids (Information in weight parts, Isocyanate Index 108; raw density approx. 37 to 39 kg/m³)

|  | Example 76 | Example 77 | Example 78 | Example 79 | Example 80 | Example 81 | Example 82 | Example 83 |
|---|---|---|---|---|---|---|---|---|
| Polyol A | 75 | 75 | 75 | 75 | 75 | 75 | 75 | 75 |
| Polymer polyol A | 25 | | | | | | | |
| Example 8 | | 25 | | | | | | |
| Example 15 | | | 25 | | | | | |
| Example 27 | | | | 25 | | | | |
| Example 35 | | | | | 25 | | | |
| Example 42 | | | | | | 25 | | |
| Example 50 | | | | | | | 25 | |
| Example 59 | | | | | | | | 25 |
| Water | 2.5 | 2.5 | 2.5 | 2.5 | 2.5 | 2.5 | 2.5 | 2.5 |
| Stabilizer | 0.7 | 0.7 | 0.7 | 0.7 | 0.7 | 0.7 | 0.7 | 0.7 |
| Catalyst 1 | 0.1 | 0.1 | 0.1 | 0.1 | 0.1 | 0.1 | 0.1 | 0.1 |
| Catalyst 2 | 0.05 | 0.05 | 0.05 | 0.05 | 0.05 | 0.05 | 0.05 | 0.05 |
| Catalyst 3 | 0.13 | 0.12 | 0.12 | 0.12 | 0.12 | 0.12 | 0.12 | 0.12 |
| Foamability | very good | very good | very good | very good | very good | very good | very good | very good |
| Open cells | very good | very good | very good | very good | very good | very good | very good | very good |
| Raw density (kg/m³) | 37 | 38 | 38 | 38 | 38 | 39 | 38 | 38 |
| Tensile strength (kPa) | 156 | 142 | 104 | 160 | 149 | 147 | 157 | 46 |
| Elongation at Break (%) | 155 | 142 | 114 | 156 | 141 | 138 | 145 | 148 |
| Hardness 40% (kPa) | 5.6 | 5.2 | 5 | 5.3 | 5.4 | 5.3 | 5.5 | 5.4 |
| Grip/elasticity | very good | very good | very good | very good | very good | very good | very good | very good |

TABLE 11

Results of the foam recipes with 20% solids (Information in weight parts; Isocyanate Index 108; raw density approx. 37 to 39 kg/m³)

|  | Example 84 | Example 85 | Example 86 | Example 87 | Example 88 | Example 89 | Example 90 | Example 91 |
|---|---|---|---|---|---|---|---|---|
| Polyol A | 50 | 50 | 50 | 50 | 50 | 50 | 50 | 50 |
| Polymer polyol A | 50 | | | | | | | |
| Example 8 | | 50 | | | | | | |
| Example 15 | | | 50 | | | | | |
| Example 27 | | | | 50 | | | | |
| Example 35 | | | | | 50 | | | |
| Example 42 | | | | | | 50 | | |
| Example 50 | | | | | | | 50 | |
| Example 59 | | | | | | | | 50 |
| Water | 2.5 | 2.5 | 2.5 | 2.5 | 2.5 | 2.5 | 2.5 | 2.5 |
| Stabilizer | 0.7 | 0.7 | 0.7 | 0.7 | 0.7 | 0.7 | 0.7 | 0.7 |
| Catalyst 1 | 0.1 | 0.1 | 0.1 | 0.1 | 0.1 | 0.1 | 0.1 | 0.1 |
| Catalyst 2 | 0.05 | 0.05 | 0.05 | 0.05 | 0.05 | 0.05 | 0.05 | 0.05 |
| Catalyst 3 | 0.13 | 0.12 | 0.12 | 0.12 | 0.12 | 0.12 | 0.12 | 0.12 |
| Foamability | very good | very good | very good | very good | very good | very good | very good | very good |
| Open cells | very good | very good | very good | very good | very good | very good | very good | very good |

TABLE 11-continued

Results of the foam recipes with 20% solids (Information in weight parts; Isocyanate Index 108; raw density approx. 37 to 39 kg/m³)

|  | Example 84 | Example 85 | Example 86 | Example 87 | Example 88 | Example 89 | Example 90 | Example 91 |
|---|---|---|---|---|---|---|---|---|
| Raw density (kg/m³) | 36 | 38 | 38 | 37 | 38 | 39 | 37 | 39 |
| Tensile strength (kPa) | 182 | 159 | 187 | 195 | 181 | 162 | 166 | 173 |
| Elongation at Break (%) | 148 | 109 | 131 | 146 | 131 | 108 | 121 | 110 |
| Hardness 40% (kPa) | 6.4 | 6.9 | 6.6 | 6.6 | 6.8 | 6.8 | 6.6 | 7 |
| Grip/elasticity | very good | very good | very good | very good | very good | very good | very good | very good |

The foaming Examples 60 to 91 show that the finely dispersed, low viscosity polymer polyol dispersions produced according to the present invention resulted in foams with comparable characteristics to those foams produced from actual commercial products which have a higher viscosity. Foam recipes containing the dispersions produced according to the present invention can be more easily processed due to their lower viscosities at the same filler content. In addition, higher solids contents can be used with them under consideration of the same maximum processing viscosity, which delivers foams with appropriately higher rigidities.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of stable, agglomerate-free, low viscosity graft copolymer dispersion comprising polymerizing at least one ethylenically unsaturated monomer in the presence of a base polyol, a macromer, and an enol ether of the formula:

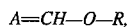

wherein:

R represents: an aliphatic hydrocarbon radical having 1 to 18 carbon atoms; a cycloaliphatic hydrocarbon radical having 5 to 10 carbon atoms; or a substituted or unsubstituted benzyl radical;

and

A represents: a divalent radical of the formula:

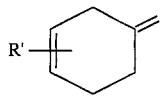

wherein:

R' represents: hydrogen or an aliphatic hydrocarbon radical having 1 to 8 carbon atoms.

2. The process of claim 1, wherein said polymerization is additionally carried out in the presence of an organic solvent.

3. The process of claim 1, wherein said ethylenically unsaturated monomer content is present in a quantity of about 25–65% by weight, based on the total weight of ethylenically unsaturated monomers and polyol.

4. The process of claim 1, wherein said ethylenically unsaturated monomers comprise styrene and acrylonitrile in a weight ratio of about 20:80 to 100:0.

5. The process of claim 4, wherein said weight ratio of said styrene and acrylonitrile monomers is about 50:50 to 80:20.

6. The process of claim 1, wherein said base polyol comprises a polyalkylene oxide containing two to six hydroxyl groups and having an OH number of 20 to 100.

7. The process of claim 6, wherein said base polyol has an OH number of 30 to 70.

8. The process of claim 1, wherein said macromer is prepared from a polyol having a functionality of 2 to 6, and a molecular weight of 3,000 to 15,000.

9. The process of claim 8, wherein said macromer is prepared from a polyol having a molecular weight of about 4,500 to 12,000.

10. The process of claim 1, wherein said macromer is present in a quantity of about 2 to 20% by weight, based on the total quantity of polyol.

11. The process of claim 10, wherein the quantity of said macromer is about 3 to 10% weight, based on the total quantity of polyol.

12. The process of claim 1, wherein said enol ether comprises (cyclohex-3-enylidene methoxymethyl)-benzene.

13. The process of claim 1, wherein said enol ether is present in a quantity of about 0.1 to 5% weight, based on the total quantity of monomer.

14. A stable, agglomerate-free, low viscosity graft copolymer dispersion, produced by the process of claim 1.

15. A polyurethane foam produced by a process comprising reacting the stable, agglomerate-free, low-viscosity graft copolymer dispersion of claim 14 with an organic polyisocyanate.

* * * * *

UNITED STATES PATENT AND TRADEMARK OFFICE
CERTIFICATE OF CORRECTION

PATENT NO. : 5,554,662
DATED : September 10, 1996
INVENTOR(S) : Josef Sanders et al It is certified that error appears in the above-indentified patent and that said Letters Patent is hereby corrected as shown below:

On the title page, item [54], change "FROM" to read --FOAM--.
On the title page, item [73], change "Adtiengesellschaft" to read --Aktiengesellschaft--.

At column 1, line 4 (in the title), correct "FROM" to read --FOAM--.

At column 1, line 50, correct "nigh" to read --high--.

At column 2, line 28, correct "E:P-A" to read --EP-A--.

At column 6, line 35, correct "tolylene" to read --toluylene--.

At column 8, line 60, before "Guidelines", insert --General--.

At column 9, line 20, correct "Example 1" to read --Examples 1-8--.

At column 11, Table 4, line 9, (in Example 31), correct "[2]" to --[3]--.

UNITED STATES PATENT AND TRADEMARK OFFICE
CERTIFICATE OF CORRECTION

PATENT NO. : 5,554,662
DATED : September 10, 1996
INVENTOR(S) : Josef Sanders et al It is certified that error appears in the above-indentified patent and that said Letters Patent is hereby corrected as shown below:

At column 14, Table 8, Example 67, correct the "Grip/Elasticity" line by deleting "good" and inserting --very good--.

At column 16, Table 10, Example 83, correct the "Tensile Strength (kPa)" line by deleting "46" and inserting --146--.

Signed and Sealed this

Twenty-fourth Day of December, 1996

Attest:

BRUCE LEHMAN

*Attesting Officer*  *Commissioner of Patents and Trademarks*